United States Patent [19]

Blake et al.

[11] Patent Number: 4,467,264
[45] Date of Patent: Aug. 21, 1984

[54] BATTERY CHARGER WITH VISUAL CHARGE INDICATING MEANS

[75] Inventors: Charles R. Blake, Cupertino, Calif.; Ferdinand H. Mullersman, Gainesville, Fla.

[73] Assignee: General Electric Company, Gainesville, Fla.

[21] Appl. No.: 523,298

[22] Filed: Aug. 16, 1983

Related U.S. Application Data

[63] Continuation of Ser. No. 60,609, Jul. 25, 1979, abandoned.

[51] Int. Cl.[3] .............................................. H02J 7/00
[52] U.S. Cl. ......................................... 320/2; 320/6; 320/15; 320/22; 320/48
[58] Field of Search .................... 320/2, 3, 4, 5, 6, 15, 320/22, 48

[56] References Cited

U.S. PATENT DOCUMENTS

| | | | |
|---|---|---|---|
| 2,483,673 | 10/1949 | Robinson et al. | 320/48 |
| 3,421,142 | 1/1969 | Kircher | 320/48 |
| 3,579,075 | 5/1971 | Floyd | 320/2 |
| 3,746,961 | 7/1973 | Doble | 320/48 |
| 4,006,396 | 2/1977 | Bogut | 320/2 |

Primary Examiner—William M. Shoop
Assistant Examiner—Anita M. Ault
Attorney, Agent, or Firm—Henry J. Policinski

[57] ABSTRACT

Charging apparatus having visual indicating means, e.g., a light emitting diode, responsive to the delivery of charging current to rechargeable cells having different physical sizes and/or electrical charging characteristics. The apparatus includes at least two sets of terminals for connecting cells requiring different respective charging current in one of two parallel charging paths. A first charge rate path supplies part of the charging current to cells of high current demand and a second charge rate path supplies charging current to cells of low current demand.

19 Claims, 1 Drawing Figure

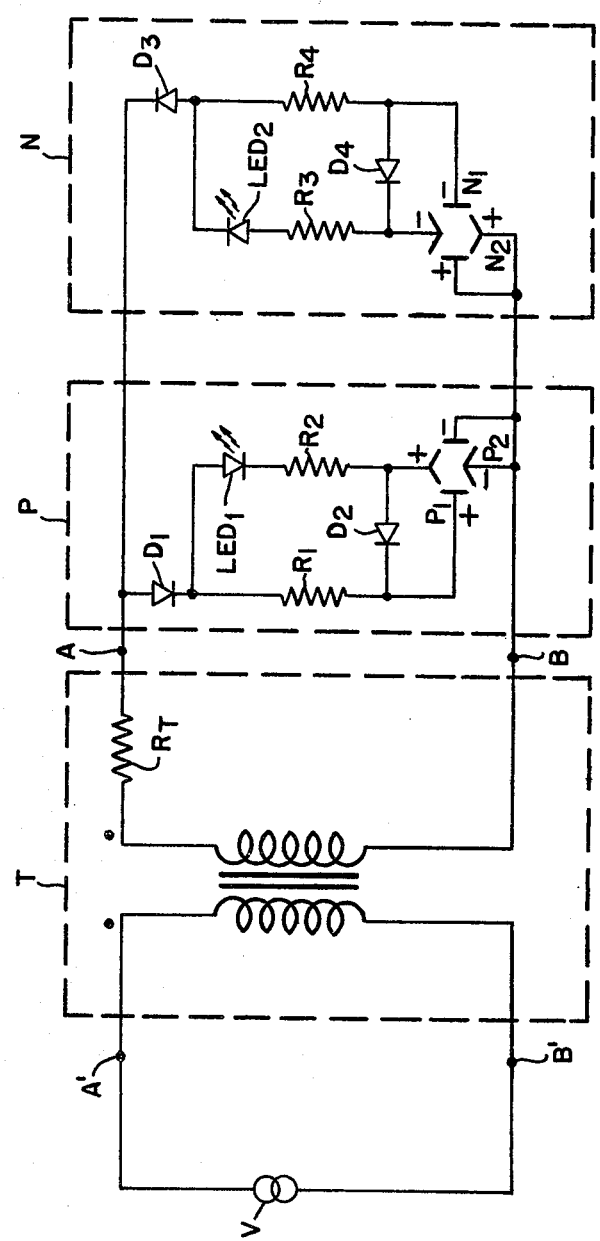

BATTERY CHARGER WITH VISUAL CHARGE INDICATING MEANS

This application is a continuation of application Ser. No. 060,609, filed July 7, 1979 now abandoned.

This invention relates to a simple, cost effective battery charger provided with visual indicating means responsive to the delivery of charging current to a battery load. More particularly, it relates to a battery charger having a light emitting diode responsive to the delivery of charging current to either of two or more different charging loads.

An increasing number of consumer products are operated by one or more rechargeable cells, for example, nickel-cadmium cells. These cells are available in many different physical sizes with various electrical charging characteristics. Constant current battery chargers are popularly utilized to recharge the battery cells for consumer products.

Although the conventional type of constant current battery charger provides a simple, inexpensive means for recharging a battery cell, it does have certain shortcomings. In particular, its primary drawback is that its operational reliability tends to degrade with time. One of the basic reasons for this degradation in performance is the build-up of current impeding (insulating) residue on the individual charging contacts of the battery charger. The primary causes of this residue build-up are oxidation, surface films such as might be caused by smog or other corrosive atmospheres, and accumulation of dust or some other type of impurity on the surface of the charging contacts. As insulating films build up, the resistance between the battery terminals and each of the charging contacts increases accordingly. This results in a marked decrease in the ability of the charger to deliver charging current to the battery cells. Often a point is reached where the resistance is sufficiently large to completely prevent the flow of charging current to the battery cell. A similar situation often occurs with build up of dust or other types of impurities on the charging contacts of the battery charger.

In the case of consumer-oriented battery chargers, users typically place the cell to be recharged in the charging apparatus for the requisite amount of time without knowing whether charge current is actually being delivered to the battery load. If the charger is not provided with indicating means, the user may never know whether the charger is functioning properly, or whether the cell is receiving a charge until he discovers, too late, that the cell is not operative. Even then, he doesn't know whether the cell or the charger is at fault. The inconvenience is often compounded where the user does not have ready access to a spare fully charged battery. For the foregoing reasons, it is desirable to provide the charger with some means for indicating whether or not the cell is actually receiving charging current.

Most inexpensive chargers rely on a low but constant charging current. Typically the battery is charged at a rate less than 0.2 C., preferably, about 0.1 C. (C=current that would discharge the battery in one hour). By limiting the charging current to a relatively small value, the cell can be left in the charger, even after it is fully charged, without degradation of the cell. On the other hand, with a fixed charging current, the utility of the charger is substantially limited. This is because some cells may require less or more charging current for proper protection of the cell, or to achieve charging in a practicable time. Accordingly, it is desirable that the charger be capable of delivering more than one fixed charging current.

Conventionally, chargers have incorporated visual indicating means such as, neon or incandescent lamps. However, the use of these devices suffers from several apparent drawbacks. In particular, decreased reliability and increased cost are associated with the additional components used to integrate such lamps with the charger circuitry. The cost factor tends to rule out their utilization in low cost consumer-oriented battery chargers. Furthermore, a separate indicating device is usually needed for each of the individual charging paths. Again, the additional cost may tend to preclude their application in consumer-oriented battery chargers.

One proposed amelioration of the problem is described in U.S. Pat. No. 4,006,396. There, a light emitting diode is connected to the charging circuit to indicate when charging current is supplied to the battery. In an alternate embodiment, a pair of light emitting diodes is used, one diode emitting a red light to indicate that a rapid charging current is being applied to the battery load and a second diode emitting a green light to indicate that a lower or trickle charge is being applied to the battery. Although this approach provides a solution to the indication problem, the circuit used is expensive to manufacture and therefore conflicts with the objective of providing the consumer with a perfectly adequate but inexpensive device. Also, the light emitting diode is probably the most expensive component utilized in a typical constant current battery charger. Therefore, it is important from a cost viewpoint to minimize the number of light emitting diodes present.

Another solution, described in Sugalski, et al. U.S. application Ser. No. 793,012, filed May 2, 1977, employs a liquid crystal coating painted onto a thin substrate closely covering the rectifying diodes in the charger circuit. This substrate forms the top of the charger case and is visible to the user. Current drawn by the charging circuit heats up a rectifying diode, which transfers heat to the liquid crystal, and changes the color of the liquid crystal material, thus indicating that a cell is on charge. The charger circuit, however, produces only a single charging current. Moreover, this approach places certain limitations on the shape and packaging of the charger since the rectifying diodes must be placed so as to conduct heat to the substrate exterior.

It is therefore one object of the invention to provide charging apparatus having visual indicating means responsive to the delivery of charging current to a battery load while avoiding the aforementioned difficulties and limitations associated with known battery chargers.

It is a further object of the invention to provide simple, cost effective charging apparatus having visual charge indicating means and capable of charging cells having different charging characteristics.

Yet another object of the invention is to provide charging apparatus having a single light emitting diode which is responsive to the delivery of charging currents of different value.

Other objects and advantages of the invention will be apparent in the following description and the practice of the invention.

SUMMARY OF THE INVENTION

The foregoing and other objects and advantages which will be apparent in the following detailed description of the preferred embodiment are achieved by the invention disclosed herein, which generally may be characterized as charging apparatus for a rechargeable cell comprising: means for providing charging current including means for connecting said charging current means to an external electrical source; charging control means connected to said charging current means and including first and second control means for providing charging current at first and second charge rates, respectively; terminal adapting means connected to said charging control means and including first and second terminal means for receiving charging current from said first and second control means, respectively, said terminal adapting means further including means for rendering one of said terminal means inoperative when charging current is delivered to said cell via the other of said terminal means; and light emitting diode means for indicating delivery of charging current to said cell via either of said first and second terminal means.

BRIEF DESCRIPTION OF THE DRAWINGS

The FIGURE is a schematic diagram of the preferred embodiment of charging apparatus having a light emitting diode to indicate that a cell to be charged is operatively connected to the charging circuit.

DETAILED DESCRIPTION OF PREFERRED EMBODIMENT

Referring to the drawing, a schematic diagram of the preferred embodiment of the present invention is illustrated. As shown, a source of ac power V, such as, 110 volt, 60 Hz line current is connectable to the battery charger via primary input terminals A' and B' of a voltage transformer T. The secondary output terminals A and B of transformer T function as a source of charging current for the remainder of the circuit. It should be understood that the simple transformer is only one of a number of charging current sources that may be used, and this invention should not be considered limited to any particular current source. In the described circuit, however, the transformer T is preferred since rectifying can be accomplished downstream.

As illustrated, a positive charging network P and a negative charging network N are connected in parallel across the secondary output terminals A and B of transformer T. $R_T$ represents the output impedance of transformer T.

In order to maximize the operating efficiency of the transformer T, it is desirable to utilize the illustrated arrangement of a positive charging network P and a negative charging network N thus utilizing both polarities of the ac wave without a centertapped secondary winding. The positive half-cycle of the ac signal provides charging current to the positive charging network P and the negative half-cycle provides charging current to the negative charging network N.

When the voltage potential across transformer output terminals A,B is positive, diode $D_1$ is forward biased and diode $D_3$ is reverse biased. Thus, positive charging network P is electrically active while negative charging network N is inactive. Similarly, when the voltage potential across transformer output terminals A,B is negative, diode $D_1$ is reverse biased and diode $D_3$ is forward biased. In this case the negative charging network N is electrically active while the positive charging network P is electrically inactive.

As earlier noted, the various types of storage cells are capable of accepting charging current at different charge rates, depending on their physical size and electrical characteristics. The standard "AA" cell, for example, is generally charged at a relatively low charge rate. On the other hand, the standard "C" and "D" cells are usually charged at a higher charge rate. Similarly, the standard rectangular cell of higher voltage is usually charged at a higher charge rate. Accordingly, to increase the flexibility and versatility of the charging apparatus of the present invention, both a high rate charging path and a low rate charging path are provided.

The positive charging network P includes a set of high rate charging terminals, or contacts, $P_1^+$ and $P_1^-$ and a set of low rate charging terminals $P_2^+$ and $P_2^-$. Positive charging network P is mechanically adapted to selectively accept only one cell at a time, i.e., only one set of battery terminals. Terminals $P_1^+$ and $P_1^-$ are mounted on a surface which is perpendicular to the surface on which terminals $P_2^+$ and $P_2^-$ are mounted. The relative position of the sets of terminals on their respective mounting surfaces is such that connection of either one of the batteries physically blocks access of the other battery to the charger terminals to which it would be connected. Also, each of the battery types has a terminal arrangement which is different from the other. Thus, either terminals $P_1^+$ and $P_1^-$ or $P_2^+$ and $P_2^-$, but not both, can receive a cell for charging at any given time. Contacts $P_1^+$ and $P_1^-$ are mechanically adapted to selectively receive the higher charge rate cells, whereas, contacts $P_2^+$ and $P_2^-$ are mechanically adapted to selectively receive the lower charge rate batteries which are physically different in size.

Similarly, the negative charging network N includes a set of high rate charging contacts $N_1^+$ and $N_1^-$ and a set of low rate charging contacts $N_2^+$ and $N_2^-$. Negative charging network N is mechanically adapted to selectively accept only one cell at a time, i.e., only one set of contacts, $N_1^+$ and $N_1^-$ $N_2^+$ and $N_2^-$ can receive a cell for charging at any given time. Contacts $N_1^+$ and $N_1^-$ are mechanically adapted to selectively receive the higher charge rate cells and contact $N_2^+$ and $N_2^-$ are mechanically adapted to selectively receive the lower charge rate cells.

In utilizing the circuitry depicted in the figure, a cell to be recharged is inserted between the high rate charging contacts $P_1^+$ and $P_1^-$ or the low rate charging contacts $P_2^+$ and $P_2^-$, depending upon the cell's characteristics. If desired, a second rechargeable cell may also be inserted between the high rate charging contacts $N_1^+$ and $N_1^-$ or the low rate charging contacts $N_2^+$ and $N_2^-$. The choice of charging contacts utilized in a particular application is based upon the type of cell to be charged. Since the operation of the positive charging network P is independent of the operation of the negative charging network N, the user may, for example, utilize the positive charging network for high rate charging and the negative charging network for low rate charging.

Upon inserting a cell between the set of high rate charging contacts $P_1^+$ and $P_1^-$, charging current is supplied to the cell through two current paths, one path comprises resistor $R_1$, the value of which, together with the transformer impedance $R_T$ and the forward impedance of diode $D_1$, determines the magnitude of the high rate charging current. The second charging current path is provided via the series connected elements of light emitting diode LED$_1$ and resistor R$_2$ coupled to the contact P$_1$+ by diode D$_2$. In the high rate charging mode of operation the light emitting diode LED$_1$ is responsive to the delivery of high rate charging current to the battery load.

Alternatively, if a rechargeable battery is inserted between the set of low rate charging contacts P$_2$+ and P$_2$−, charging current is supplied to the cell through the low rate current path comprising light emitting diode LED$_1$ connected in series with resistor R$_2$. In this mode of operation, diode D$_2$ is reverse biased due to the voltage drop in the second current path and no current flows through resistor R$_1$. The magnitude of the low rate charging current is determined by the values of transformer output voltage, resistor R$_2$, transformer impedance R$_T$, the forward impedance of diode D$_1$ and the forward impedance of light emitting diode LED$_1$. Again, in the low rate charging mode of operation the light emitting diode LED$_1$ is responsive to the delivery of low rate charging current to the battery load.

It is apparent that a wide range of possible current rates may be provided by properly selecting the appropriate values for resistors R$_T$, R$_1$ and R$_2$. The interdependency between the values of resistors R$_T$, R$_1$ and R$_2$ is well known to those skilled in the art and is readily derived. It is also apparent that only one light emitting diode is required to visually indicate that charging current is flowing in either the high rate charging path or the low rate charging path.

The operation of the negative charging network N is identical to the operation of the positive charging network P. The functions of components D$_3$, R$_4$, LED$_2$, R$_3$ and D$_4$ are identical to those of the corresponding components D$_1$, R$_1$, LED$_1$, R$_2$ and D$_2$ in the positive charging network P.

Exemplary values for the various components embodied in the circuit illustrated in the figure are as follows. Unless otherwise specified, resistor wattages are ¼ watt.

R$_1$—27 ohms, 1 watt
R$_2$—68 ohms
R$_3$—68 ohms
R$_4$—27 ohms, 1 watt
T—Secondary open circuit voltage=11.5 VAC; Impedance reflected to secondary=34 ohms
D$_1$—1N 4001
D$_2$—1N 4001
D$_3$—1N 4001
D$_4$—1N 4001
LED$_1$—Monsanto MV5053
LED$_2$—Monsanto MV5053

Although the embodiment illustrated in the figure depicts a single positive charging network P and a single negative charging network N, the charging apparatus of the present invention can easily be expanded to accommodate more than one positive charging network P and more than one negative charging network N. Depending upon the user's preference, the values selected for the corresponding counterparts of resistors R$_1$, R$_2$, R$_3$ and R$_4$ could be changed to accommodate different charge rates in each of the different current paths. Moreover, the above description of the preferred embodiment is exemplary and should not be considered as limiting the scope of the present invention, since certain modifications and variations are possible.

What is claimed is:

1. Charging apparatus for a rechargeable cell comprising:
   (a) means for providing charging current including means for connecting said charging current means to an external electrical source;
   (b) a charging network connected to said charging current means and including first and second charging paths for providing charging current at a first charge rate and a second charge rate, respectively;
   (c) means for accepting said cell, said cell accepting means connected in said charging network and including first and second pairs of charging contacts for receiving charging current in said first and second charging paths, respectively, said cell accepting means rendering said first charging path inoperative when charging current is delivered to said cell via said second charging path and rendering said second charging path inoperative when charging current is delivered to said cell via said first charging path; and
   (d) a light emitter for emitting light to indicate delivery of charging current via said first and second charging paths, said light emitter emitting light to indicate delivery of said charging current only in response to the delivery of charging current via said first charging path when said second charging path is inoperative and only in response to the delivery of charging current via said second charging path when said first charging path is inoperative.

2. Apparatus as recited in claim 1, wherein said charging current means includes a transformer for connection between the external source and said charging network.

3. Apparatus as recited in claim 2, wherein said charging network including rectifying means interconnected between said charging current means and each of said first and second charging paths.

4. Charging apparatus comprising:
   (a) means for providing charging current and adapted for connection to an external electrical source;
   (b) a first charging network connected to said charging current means and having a first charging path for providing charging current at a first high charge rate and second charging path for providing charging current at a second low charge rate;
   (c) first terminal means including first and second pairs of charging contacts for receiving charging current in said first and second charging paths, respectively, said first terminal means further including means for rendering said first charging path inoperative when charging current is delivered to a first rechargeable cell via said second charging path and for rendering said second charging path inoperative when charging current is delivered to a first rechargeable cell via said first charging path;
   (d) a first light emitter connected in said first charging network for emitting light to indicate delivery of charging current to said first cell via said first and second charging paths, said first light emitter emitting light to indicate delivery of said charging current only in response to the delivery of charging current via said first charging path when said second charging path is rendered inoperative and only in response to the delivery of charging current via said second charging path when said first charging path is rendered inoperative;

(e) a second charging network connected to said charging current means and having a third charging path for providing charging current at a third high charge rate and a fourth charging path for providing charging current at a fourth low charge rate;

(f) second terminal means including third and fourth pairs of charging contacts for receiving charging current in said third and fourth charging paths, respectively, said second terminal means further including means for rendering said third charging path inoperative when charging current is delivered to a second rechargeable cell via said fourth charging path and for rendering said fourth charging path inoperative when charging current is delivered to said second cell via said third charging path; and (g) a second light emitter connected to said second charging network for emitting light to indicate delivery of charging current to said second cell via said third or fourth charging paths, said second light emitter emitting light to indicate delivery of said charging current only in response to the delivery of charging current via said third charging path when said fourth charging path is rendered inoperative and only in response to the delivery of charging current via said fourth charging path when said third charging path is rendered inoperative.

5. Apparatus as recited in claim 4, wherein said charging current means includes a transformer for connection between the external source and each of said first and second charging networks.

6. Apparatus as recited in claim 5, wherein said first charging network includes a rectifier connected between said charging current means and each of said first and second charging paths thereof, and wherein said second charging network includes a second rectifier connected between said charging current means and each of said third and fourth charging paths thereof.

7. Apparatus for charging simultaneously at least two chargable cells, comprising:

(a) means for providing charging current upon connection to an external electrical source;

(b) a positive charging circuit connected to said charging current means and having a first current branch for providing positive charging current at a first charge rate and a second current branch for providing positive charging current at a second charge rate;

(c) positive terminal means connected to said positive charging circuit and having first and second pairs of charging contacts for receiving positive charging current from said first and second current branches, said positive terminal means further including means for rendering each of said first and second current branches inoperative, said means rendering only one of said first or second current branches inoperative when positive charging current is delivered to a first rechargeable cell via the other of said first or second current branches;

(d) a first light emitting diode connected to said positive charging circuit for emitting light to indicate delivery of positive charging current to said first cell, said first light emitting diode emitting light in response to the delivery of charging current via each of said first and second current branches, said first diode emitting light only in response to the delivery of charging current via said other of said first or second current branches when said one of said first or second current branches is rendered inoperative;

(e) a negative charging circuit connected to said charging current means and having a third current branch for providing negative charging current at a third charge rate and a fourth current branch for providing negative charging current at a fourth charge rate;

(f) negative terminal means connected to said negative charging circuit and having third and fourth pairs of charging contacts for receiving negative charging current in said third and fourth current branches, said negative terminal means further including means for rendering each of said third and fourth current branches inoperative, said means rendering only one of said third and fourth current branches inoperative when negative charging current is delivered to a second rechargeable cell via the other of said third and fourth current branches; and (g) a second light emitting diode connected to said negative charging circuit for emitting light to indicate delivery of negative charging current to said second cell, said second light emitting diode emitting light in response to the delivery of charging current via each of said third and fourth current branches, said second diode emitting light only in response to the delivery of charging current via said other of said third and fourth current branches when said one of said third or fourth current branches is rendered inoperative.

8. Charging apparatus for a rechargeable cell comprising:

(a) a transformer having a pair of primary terminals adapted for connection to an external source of alternating current, and a pair of secondary terminals;

(b) a charging control network connected across said secondary transformer terminals and comprising a rectifying diode and first and second current branches in series therewith, said current branches providing charging currents of different amplitudes;

(c) a set of charging contacts connected in each of said current branches;

(d) means disposed in said charging control network for rendering said first current branch inoperative when charging current is delivered to a cell via said second current branch and for rendering said second current branch inoperative when charging current is delivered to a cell via said first current branch; and (e) a light emitter emitting light only in response to charging current delivered via said set of contacts in said first current branch when said second current branch is rendered inoperative and only in response to charging current delivered via said set of contacts in said second current branch when said first current branch is rendered inoperative.

9. Charging apparatus comprising:

(a) a transformer having a pair of primary terminals adapted for connection to an external source of alternating current, and a pair of secondary terminals;

(b) a first charging control network connected across said secondary transformer terminals and comprising a rectifying diode and first and second current branches in series therewith, said current branches providing charging currents of different amplitudes;

(c) a first set of charging contacts connected in each of said first and second current branches;

(d) means disposed in said first charging control network for rendering said contacts in said first current branch inoperative when charging current is delivered to a first rechargeable cell via said set of contacts in said second current branch and for rendering said set of contacts in said second current branch inoperative when charging current is delivered to a first rechargeable cell via said set of contacts in said first current branch;

(e) a first light emitting diode emitting light only in response to charging current delivered via said set of contacts in said first current branch when said set of contacts in said second current branch is rendered inoperative and only in response to charging current delivered via said set of contacts in said second current branch when said set of contacts in said first current branch is rendered inoperative;

(f) a second charging control network connected across said secondary transformer terminals and comprising a rectifying diode and third and fourth current branches in series therewith, said current branches providing charging currents of different amplitudes;

(g) a second set of charging contacts connected in each of said third and fourth current branches;

(h) means disposed in said second charging control network for rendering said contacts in said third current branch inoperative when charging current is delivered to a second rechargeable cell via said set of contacts in said fourth current branch and for rendering said set of contacts in said fourth current branch inoperative when said charging current is delivered to a second rechargeable cell via said set of contacts in said third current branch; and (i) a second light emitting diode emitting light only in response to charging current delivered via said set of contacts in said third current branch when said set of contacts in said fourth current branch is rendered inoperative and only in response to charging current delivered via said set of contacts in said fourth current branch when said set of contacts in said third current branch is rendered inoperative.

10. Apparatus for charging simultaneously at least two rechargeable cells, comprising:

(a) a transformer having a pair of primary terminals adapted for connection to an external source of alternating current, and a pair of secondary terminals;

(b) a positive charging control network connected across said secondary transformer terminals and comprising a positive rectifying diode and first and second current branches in series therewith, said current branches providing positive charging currents of different amplitudes;

(c) a positive terminal adapter including a set of positive charging contacts connected in each of said current branches;

(d) means for rendering one of said sets of contacts inoperative when positive charging current is delivered to a first rechargeble cell via the other of said sets of contacts;

(e) a first light emitting diode emittinng light in response to positive charging current delivered to said first cell via said charging contacts in either of said branches in said positive charging control network;

(f) a negative charging control network connected across said secondary transformer terminals and comprising a negative rectifying diode and first and second current branches in series therewith, said current branches providing negative charging currents of different amplitudes;

(g) a negative terminal adapter including a set of negative charging contacts connected in each of said current branches;

(h) means for rendering one of said sets of contacts inoperative when negative charging current is delivered to a second rechargeable cell via the other of said sets of contacts; and (i) a second light emitting diode emitting light only in response to negative charging current delivered to said second cell via said charging contacts in either of said branches in said negative charging control network.

11. An electrochemical cell charging apparatus for providing charging current to a cell connected between one of two sets of charging terminals associated with such apparatus comprising:

(a) means for connection to an alternating current source;

(b) a charging network including at least one rectifier coupled to said connection means for converting alternating current from the source into unidirectional charging current;

(c) first and second current branches connected between said rectifier and respective sets of cell-receiving charging terminals;

(d) a diode interconnecting the corresponding terminals of each of the terminal sets, whereby unidirectional charging current supplied to the terminal of said first current branch may flow through said diode to the corresponding terminal of said second current branch when a cell is connected in circuit with the terminal set of said second current branch, and whereby unidirectional charging current in said second current branch is blocked by said diode when a cell is connected in circuit with the terminal set of said first current branch; and (e) a light emitting diode connected in series with said first current branch to indicate the supply of charging current to a cell connected in circuit with either of said terminal sets.

12. Apparatus as recited in claim 11, including means for rendering one of said sets of charging terminals inoperative when charging current is delivered to said cell via the other of said sets of charging terminals.

13. Apparatus for charging simultaneously at least two rechargeable cells, comprising:

(a) means for connection to an alternating current source;

(b) a positive charging network including at least one rectifier coupled to said connection means for converting alternating current from the source into positive charging current, and first and second current branches connected between said rectifier and respective sets of cell-receiving positive charging terminals;

(c) a diode interconnecting the corresponding terminals of each of the positive charging terminal sets, whereby positive charging current supplied to the terminal of said first current branch may flow through said diode to the corresponding terminal of said second current branch when a first cell is connected in circuit with the terminal set of said second current branch, and whereby positive charging current in said second current branch is blocked by said diode when said first cell is connected in circuit with the terminal set of said first current branch;

(d) a first light emitting diode connected in series with said first current branch to indicate the supply of positive charging current to said first cell connected in circuit with either of said positive terminal sets;

(e) a negative charging network including at least one rectifier coupled to said connection means for converting alternating current from the source into negative charging current, and first and second current branches connected between said rectifier and respective sets of cell-receiving negative charging terminals;

(f) a diode interconnecting the corresponding terminals of each of the negative charging terminal sets, whereby negative charging current supplied to the terminal of said first current branch may flow through said diode to the corresponding terminal of said second current branch when a second cell is connected in circuit with the terminal set of said second current branch, and whereby negative charging current in said second current branch is blocked by said diode when said second cell is connected in circuit with the terminal set of said first current branch; and (g) a second light emitting diode connected in series with said first current branch to indicate the supply of negative charging current to said second cell connected in circuit with either of said negative terminal sets.

14. Apparatus as recited in claim 13, including means for rendering one of said sets of positive charging terminals inoperative when positive charging current is delivered to said first cell via the other of said sets of positive charging terminals, and means for rendering one of said sets of negative charging terminals inoperative when negative charging current is delivered to said second cell via the other of said sets of negative charging terminals.

15. An electrochemical cell charging apparatus for providing charging current to a cell connected between one of two sets of charging terminals associated with such apparatus:

(a) means for connection to an alternating current source;

(b) a charging network including at least one rectifier for converting alternating current from said source into unidirectional charging current;

(c) first and second current branches disposed in said charging network;

(d) terminal means for receiving charging current disposed in said first and second current branches, said terminal means including first and second sets of charging contacts disposed in said first and second current branches respectively;

(e) means disposed in said charging network for rendering said first current branch inoperative when charging current is delivered to a rechargeable cell via said second current branch and for rendering said second current branch inoperative when charging current is delivered to a rechargeable cell via said first current branch;

(f) a light emitter connected in said first current branch and emitting light in response to the delivery of charging current to a rechargeable cell via said first set of charging and in response to the flow of charging current to a rechargeable cell via said second set of charging contacts; and (g) a unidirectional current flow device connected electrically between said first and second current branches and establishing a current path between said light emitter and said second current branch, said current flow device preventing the flow of current between said current branches when said charge current is delivered via said first set of contacts whereby said light emitter emits light only in response to the delivery of charging current via said first set of charging contacts, said current flow device permitting current flowing through said light emitter to flow through said current path to said second current branch when said charge current is delivered via said second set of contacts whereby said light emitter emits light only in response to the delivery of charging current via said second set of charging contacts.

16. Charging apparatus for a rechargeable cell comprising:

(a) means for providing charging current including means for connecting said charging current means to an external electrical source;

(b) a charging network connected to said charging current means and including a plurality of alternative charging paths for providing charging current at a plurality of charge rates;

(c) a pair of charging contacts disposed in each charging path of said plurality for receiving charging current in its respective charging path;

(d) means for rendering each charging path in said plurality inoperative, said rendering means effective when charging current is delivered to said cell via any one of said charging paths in said plurality to render the remaining charging paths in said plurality inoperative whereby only one charging path of said plurality may provide charge current to said cell at any given time;

(e) a light emitter for emitting light to indicate delivery of charging current to said cell via each charging path in said plurality, said light emitter emitting light to indicate delivery of said charging current only in response to the delivery of charging current via said one of said charging paths when said remaining charging paths are inoperative.

17. The invention as set forth in claim 16 wherein said light emitter is electrically in parallel with a charging path in said plurality of alternative charging paths.

18. Charging apparatus for a rechargeable cell comprising:

(a) means for providing charging current including means for connecting said charging current means to an external source;

(b) a charging network connected to said charging current means and including first and second charging paths for providing charge current;

(c) terminal means disposed in each charging path;

(d) means for rendering each of said first and second charging paths inoperative, said means rendering said first charging path inoperative when charging current is delivered to said cell via said second charging path and rendering said second charging path inoperative when charging current is delivered to said cell via said first charging path; and (e) a light emitter for emitting light in response to the delivery of charging current via said first and second charging paths, said light emitter emitting light only in response to the delivery of charging current via said first charging path when said second charging path is inoperative and only in response to the delivery of charging current via said second charging path when said first charging path is rendered inoperative.

19. The invention as set forth in claim 18 wherein said light emitter is electrically in parallel with one of said first or second charging paths.

* * * * *